April 11, 1967

J. BENSIMON ETAL 3,313,961

THERMIONIC ENERGY CONVERTER EMPLOYING
MULTIPLE REFLECTION IONIZATION

Filed Nov. 7, 1963

INVENTORS
J. BENSIMON et P. LAURES

BY Paul M. Craig, Jr.
ATTORNEY

United States Patent Office 3,313,961
Patented Apr. 11, 1967

3,313,961
THERMIONIC ENERGY CONVERTER EMPLOYING MULTIPLE REFLECTION IONIZATION
Jacques Bensimon and Pierre Laures, Paris, France, assignors to CSF—Compagnie Generale de Telegraphie Sans Fils, Paris, France
Filed Nov. 7, 1963, Ser. No. 322,100
Claims priority, application France, Nov. 19, 1962, 915,792
8 Claims. (Cl. 310—4)

The present invention relates to direct thermo-electronic converters for directly converting thermal energy into electrical energy.

It is known that, in its most simple form, such a converter comprises a pair of electrodes, particularly an electron emitter and an electron collector, disposed within a vacuum-tight enclosure. These electrodes may be insulated from one another or may be connected by a relatively resistant metallic conductor, but in any event, no external voltage source is applied therebetween. If one applies heat to the emitter, the energy of certain electrons within the emissive material increases beyond the working potential, these electrons thereupon leave the emitter and move in the direction toward the collector provided the effects of interelectrode space charge are not too important. An electric voltage then appears between the emitter and collector which may be applied to a suitably matched load resistance.

As already indicated hereinabove, the possibility of the operation of such a device depends on the absence or the negligible importance of the space charge effects. It is therefore necessary to compensate the space charge effect, and it is known to do so by introducing into the enclosure an ionizable gas or vapor, for example, of cesium of which the ionization must be assured by impact of the electrons issued from the emitter. This ionization mechanism is usually called volume ionization.

The present invention relates more particularly to converters having volume ionization of a substance such as cesium, and has as its object to increase the efficiency thereof.

In the converters of this type known to date, the emitter was exposed to a flow or flux of heat without permitting any flow or flux of light to penetrate into the tight enclosure. The efficiency of these prior art converters is low, and this is believed attributable to the fact that among the electrons issued by the emitter, a large portion have an insufficient energy to participate in the mechanism of volume ionization.

Research and experiments have made it possible to establish the fact that if the neutral atoms of the ionizable substance are excited by a sufficient number of photons, then even these electrons of low energy become to a very large proportion, participants in the mechanism of ionization, and the efficiency of the converter is strongly improved. Nevertheless, to assure this excitation, it does not suffice, for example, to realize a converter with a transparent envelope and to expose the same to light. It will be shown that under these conditions, the light which penetrates the vessel or enclosure and which leaves therefrom by the opposite side, does not subject the ionizable gas to the action of a sufficient quantity of photons per unit volume to assure the desired improvement according to the present invention.

The present invention provides therefore a direct thermo-electronic converter for directly converting thermal energy into electrical energy, comprising an electron emitter and an electron collector disposed within a vacuum-tight enclosure filled with an ionizable gas in the gaseous state, in combination with means to concentrate the volumetric density of light energy admitted into the tight enclosure to excite by photons the atoms of the ionizable substance in such a manner as to substantially increase the degree of ionization of this substance by the electrons issued from the emitter.

According to one embodiment of the present invention, one or several elements of the vacuum-tight enclosure, such as the emitter or the opaque insulating wall, are provided with at least one aperture or orifice to admit to the inside of the enclosure a directed flux or flow of light, means comprising a suitable form and/or a suitable treatment of the interior wall of the enclosure being provided in order that this flow or flux of light be subjected to multiple reflections and thereby effectuate multiple traversals through the medium filled with the ionizable body.

According to another embodiment of the present invention, a converter with a transparent envelope is surrounded by a system of mirrors into which one introduces a flux or flow of light undergoing multiple reflections and traversing, between these reflections, the medium filled with the ionizable body across the said envelope.

Additionally, the flow or flux of light may be suitably filtered so as to act on the ionizable body only by its most useful portion of the spectrum.

Accordingly, it is an object of the present invention to provide a direct thermo-electronic converter which by simple means, obviates the drawbacks and shortcomings of similar types of converters known in the prior art.

It is another object of the present invention to provide a direct thermo-electronic converter which by relatively inexpensive means, assures a significantly improved efficiency of the device.

Still a further object of the present invention resides in the provision of a direct thermo-electronic converter which effectively overcomes the space charge effects without elaborate structures or auxiliary devices that may add weight to the converter or increase its complexity.

A still further object of the present invention resides in the provision of a direct thermo-electronic converter in which the number of electrons emitted by the emitter which participates in the ionization mechanism is effectively and substantially increased.

Still another object of the present invention resides in the provision of a direct thermo-electronic converter in which multiple traversals of light energy is utilized to increase the efficiency of the device.

These and other objects, features and advantages of the present invention will become more obvious from the following description when taken in connection with the accompanying drawing which shows, for purposes of illustration only, several embodiments in accordance with the present invention, and wherein.

Figure 1:
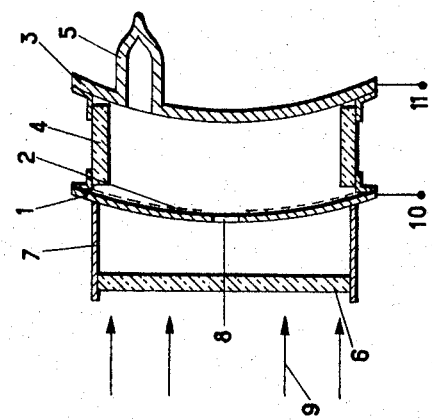
FIGURE 1 is a cross sectional view of a first embodiment of a thermo-electronic converter in accordance with the present invention comprising internal reflection means within the converter.

Referring now to the drawing wherein like reference numerals are used throughout the various views to designate like parts, and more particularly to FIGURE 1, the thermo-electronic converter illustrated therein comprises an emitter 1 realized in the form of a convex washer, for example, of molybdenum, covered on its concave face with a layer 2 of a material with thermionic emission having a very low working potential, for example, of alkaline-earth oxide or mixtures of alkaline-earth oxides; a collector 3, in the form of a convex disk, for example, of copper or nickel of which the convex face may be rendered brilliant and light-reflecting, by any appropriate conventional process; and an insulating ring 4 of material opaque to light, sealed to the emitter 1 and to the collector 3 in such a manner as to define a vacuum-tight enclosure. An exhaust stem 5 is cut after having served, at first for the evacuation of the enclosure, thereupon to its filling with the cesium vapor under pressure of the order of 1 or 2 Torr. A window 6, for example, of sapphire is sealed within the cylinder 7, for example, of titanium, of which the rim in its turn is sealed onto the convex face of the washer 1. The collector 3 may be cooled by any suitable convetional means (not shown).

According to the present invention, at least a portion of the emitter 1 is rendered transparent to the light by providing at least one aperture 8 which is either obturated with transparent material or non-obturated.

In operation, the flow or flux of heat and light, furnished for example by the solar energy, directed according to arrows 9 and eventually filtered to delimit a suitable portion of the spectrum, penetrates across the window 6 and heats the emitter 1, whereby a portion of this flow or flux defined by the aperture 8 penetrates thereupon the enclosure of the converter where the light undergoes multiple reflections on the convex face of the collector 3 and on the concave face of the emitter 1; the flow or flux of light is concentrated and the density thereof per unit volume increases whereas the photons effectuate multiple shocks or impacts on the atoms of cesium and facilitate the ionization thereof under the action of the electrons emitted by the heated layer 2. The converter operates then as a conventional converter, but with improved efficiency, and the output voltage is collected as usual between the emitter 1 and the collector 3 at the connections or terminals 10 and 11.

Figure 2:
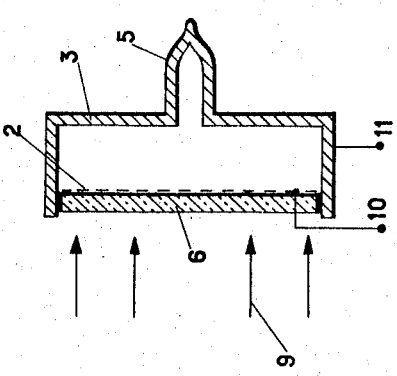
FIGURE 2 is a cross sectional view of a second embodiment of a thermo-electronic converter in accordance with the present invention provided with internal reflection means, similar to FIGURE 1.

In the modified embodiment of FIGURE 2, in which the same reference numerals as used in FIGURE 1 designate analogous elements, the window 6 is sealed directly into the collector 3 in the form of a cupel-shaped or dish-shaped element, and the layer 2, disposed directly on the insulating face of the window 6, is sufficiently thin to be semi-transparent. The deposit of the layer 2 is made in such a manner that no contact exists with the metal of the collector 3. The connection 10 is established with the layer 2 by passing through the insulation of the window 6. The operation is the same as that of FIGURE 1.

Figure 3:
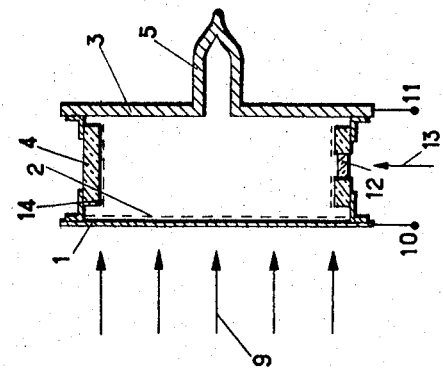
FIGURE 3 is a cross sectional view of a third embodiment of a thermo-electronic converter in accordance with the present invention and also provided with internal reflection means.

FIGURE 3 relates to the case in which the flow or flux of light, instead of originating from the same source of energy as the flow of heat, is directed laterally and furnished by a special source. In this case, the emitter 1 and the collector 3 are plane disks, since a concave form is not useful for the same as they have no role to play in the reflection of the light. No aperture 8 is provided in this embodiment and the window 6 is suppressed as the flow or flux of heat directly heats the emitter 1 in the direction of arrows 9. In contradistinction thereto, an obturated aperture 12 formed by a transparent window is provided within the wall of the insulating ring 4 to permit the flow or flux of light in the direction of arrow 13 to enter the converter enclosure. The interior surface of the ring 4 may be rendered reflective by any suitable known treatment, and in case of need, may be covered with a metallization 14 to form concave cylindrical mirrors producing multiple reflections of the light and concentrating the flux or flow in such a manner as to increase the density per unit volume as in the preceding examples. The operation and the results of this embodiment are the same as before.

Figures 4, 5:
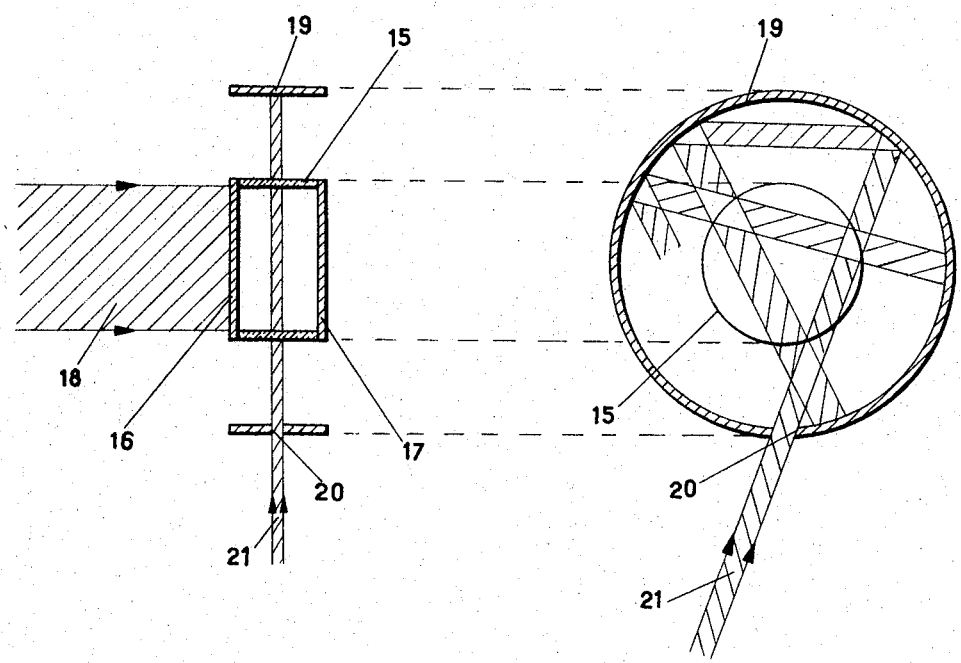
FIGURE 4 is an axial cross sectional view through a fourth embodiment of a thermo-electronic converter in accordance with the present invention in which the reflection means are external.
FIGURE 5 is a transverse cross sectional view of the embodiment of FIGURE 4.

In the embodiment of FIGURES 4 and 5, the converter is constituted by a cylindrical box with transparent lateral walls 15, for example of sapphire, while the covers of the cylinder are formed by the emitter 16 and the collector 17. The flow of heat 18, coming from a suitable source not illustrated, is directed toward the emitter 16. According to the present invention, the converter is surrounded by a cylindrical mirror 19, provided with an orifice 20, across which passes the flux or flow of light 21 furnished from a source not illustrated. This flux or flow of light 21, as is shown in particular in FIGURE 5, undergoes multiple reflections within the mirror 19, while between the reflections passing through the inside of the converter thanks to the transparent walls 15. It thus effectuates multiple traversals of the medium filled with the ionizable body and improves the operation of the converter in the same manner as in the preceding embodiments.

While we have shown and described several embodiments in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. An energy converter having vacuum-tight enclosure means, comprising:
  emitter electrode means supported within said enclosure means for emitting electrons into said enclosure means upon application of heat to said emitter electrode means,
  collector means supported within said enclosure means for collecting the electrons emitted from said emitter means, said collector means being electrically insulated and spaced from said emitter means and defining a space therebetween,
  an ionizable substance in gaseous state at relatively low pressure within said enclosure means and said space,
  means in said converter for admitting into said enclosure means and said space a photon flow of radiant energy,
  and means supported within said enclosure means for reflecting and concentrating the volume density of said radiant energy within said space to enhance ionization of said substance by the electrons emitted from said emitter electrode means.

2. An energy converter having vacuum-tight enclosure means, comprising:
  emitter electrode means supported within said enclosure means for emitting electrons into said enclosure means upon application of heat to said emitter electrode means,
  collector means supported within said enclosure means for collecting the electrons emitted from said emitter means, said collector means being electrically insulated and spaced from said emitter means and defining a space therebetween,
  an ionizable substance in gaseous state at relatively low pressure within said enclosure means and said space,
  means in said converter for admitting into said enclosure means and said space a photon flow of radiant energy,
  and concentrator means supported within said enclosure means for reflecting and concentrating the volume density of said radiant energy within said space to enhance ionization of said substance by the electrons emitted from said emitter electrode means,
  said means for admitting into said enclosure means and said space the photon flow of radiant energy including at least one member substantially transparent to light, and said concentrator means comprising a reflective surface on at least some of the internal faces of said enclosure means.

3. An energy converter having vacuum-tight enclosure means, comprising:
   emitter electrode means supported within said enclosure means for emitting electrons into said enclosure means upon application of heat to said emitter electrode means,
   collector means supported within said enclosure means for collecting the electrons emitted from said emitter means, said collector means being electrically insulated and spaced from said emitter means and defining a space therebetween,
   an ionizable substance in gaseous state at relatively low pressure within said enclosure means and said space,
   means in said converter for admitting into said enclosure means and said space a photon flow of radiant energy,
   and concentrator means within said enclosure means for reflecting and concentrating the volume density of said radiant energy within said space to enhance ionization of said substance by the electrons emitted from said emitter electrode means,
   said means for admitting into said enclosure means the photon flow of radiant energy including at least one aperture substantially transparent to light provided in said emitter electrode means, and said concentrator means comprising reflective surface on at least some of the internal faces of said enclosure means,
   said reflective surface being effectively formed by a curved shape of said collector electrode means, and a transparent window member for directing heating and photon radiant energy onto said emitter electrode means.

4. An energy converter having vacuum-tight enclosure means, comprising:
   emitter electrode means supported within said enclosure means for emitting electrons into said enclosure means upon application of heat to said emitter electrode means,
   collector means supported within said enclosure means for collecting the electrons emitted from said emitter means, said collector means being effectively electrically insulated from and spaced from said emitter means and defining a space therebetween,
   an ionizable substance in gaseous state at relatively low pressure within said space,
   means in said converter for admitting into said enclosure means and said space a photon flow of radiant energy,
   and means for reflecting the photon flow of energy within said space for concentrating the volume density of said radiant energy within said space to enhance ionization of said substance by the electrons emitted from said emitter electrode means,
   and output means to enable abstracting electric power between said emitter electrode means and said collector electrode means.

5. An energy converter having vacuum-tight enclosure means, comprising:
   a window comprising a member substantially transparent to light in said enclosure means,
   emitter electrode means supported within said enclosure means for emitting electrons into said enclosure means upon application of heat to said emitter electrode means comprising a semitransparent layer coating the internal face of said window,
   collector means supported within said enclosure means for collecting the electrons emitted from said emitter means, said collector means being electrically insulated from and spaced from said emitter means and defining a space therebetween,
   an ionizable substance in gaseous state at relatively low pressure within said enclosure means and said space,
   said window serving to admit into said enclosure means and said space a photon flow of radiant energy,
   means within said enclosure means for reflecting and concentrating the volume density of said radiant energy within said space to enhance ionization of said substance by the electrons emitted from said emitter electrode means, and
   output means to enable abstracting electric power between said emitter electrode means and said collector electrode means.

6. An energy converter having vacuum-tight enclosure means, comprising:
   emitter electrode means supported within said enclosure means for emitting electrons into said enclosure means upon application of heat to said emitter electrode means,
   collector means supported within said enclosure means for collecting the electrons emitted from said emitter means,
   a portion of said enclosure means being formed by an insulating wall substantially transparent to light and secured between said emitter and collector electrode means, for electrically insulating and spacing apart one from the other to define a space therebetween,
   an ionizable substance in gaseous state at relatively low pressure within said enclosure means and said space,
   means in said converter for admitting into said enclosure means and said space a photon flow of radiant energy including said insulating wall, and mirror means surrounding said wall and provided with at least one aperture transparent to light for reflecting and concentrating the volume density of said radiant energy within said space to enhance ionization of said substance by the electrons emitted from said emitter electrode means,
   output means to enable abstracting electric power between said emitter electrode means and said collector electrode means,
   and means for directing a light beam through said aperture and said wall onto said mirror means to thereby produce multiple reflections of said light beam on said mirror means and multiple passages of said beam through said enclosure means space.

7. An energy converter provided with vacuum-tight enclosure means, comprising:
   emitter electrode means supported within said enclosure means for emitting electrons into said enclosure means upon application of heat to said emitter electrode means,
   collector means supported within said enclosure means for collecting the electrons emitted from said emitter means, said collector means being electrically insulated from and spaced from said emitter means and defining a space therebetween,
   an ionizable substance in gaseous state at relatively low pressure within said enclosure means and said space,
   means in said converter for admitting into said enclosure means and said space a photon flow of radiant energy including filter means for filtering a predetermined portion of the spectrum of said radiant energy prior to the admission of the filtered portion into said space,
   means within said enclosure means for reflecting and concentrating the volume density of said radiant energy within said space to enhance ionization of said substance by the electrons emitted from said emitter electrode means,
   and output means to enable abstracting electric power between said emitter electrode means and said collector electrode means.

8. An energy converter having vacuum-tight enclosure means, comprising:
   emitter electrode means supported within said enclosure means for emitting electrons into said enclosure means upon application of heat to said emitter electrode means,
   collector means supported within said enclosure means for collecting the electrons emitted from said emitter means,
   insulating wall means substantially opaque to light and disposed between said electrode means for electrically insulating and spacing the same apart to define an electrode space therebetween,
   an ionizable substance in gaseous state at relatively low pressure within said enclosure means and said space,
   means in said converter for admitting into said enclosure means and said space a photon flow of radiant energy,
   and concentrator means for reflecting and concentrating the volume density of said radiant energy within said space to enhance ionization of said substance by the electrons emitted from said emitter electrode means,
   and output means to enable abstracting electric power between said emitter electrode means and said collector electrode means,
   said means for admitting into said space the photon flow of radiant energy including at least one aperture transparent to light, means for directing a light beam through said aperture into said space, and said concentrator means being in the form of a metallization on the internal face of said insulating wall means for reflecting the light, and
   said aperture being provided in said insulating wall means and the metallized face.

References Cited by the Examiner

UNITED STATES PATENTS

| 3,021,472 | 2/1962 | Hernqvist | 310—4 |
| 3,026,439 | 3/1962 | Greer | 310—4 |
| 3,155,849 | 11/1964 | Haring | 310—4 |
| 3,201,618 | 8/1965 | Coleman | 310—4 |

FOREIGN PATENTS 919,148  2/1963  Great Britain.

MILTON O. HIRSHFIELD, *Primary Examiner.*

J. W. GIBBS, *Assistant Examiner.*